United States Patent
Bonneau et al.

(10) Patent No.: US 9,884,959 B2
(45) Date of Patent: Feb. 6, 2018

(54) EPOXY-BASED RESIN COMPOSITION FOR COMPOSITE MATERIALS

(71) Applicant: Cytec Industries Inc., Woodland Park, NJ (US)

(72) Inventors: Mark Richard Bonneau, Brea, CA (US); Claude Billaud, Marske-By-The-Sea (GB)

(73) Assignee: Cytec Industries Inc., Woodland Park, NJ (US)

( * ) Notice: Subject to any disclaimer, the term of this patent is extended or adjusted under 35 U.S.C. 154(b) by 223 days.

(21) Appl. No.: 14/968,952

(22) Filed: Dec. 15, 2015

(65) Prior Publication Data

US 2016/0168372 A1    Jun. 16, 2016

Related U.S. Application Data

(60) Provisional application No. 62/092,448, filed on Dec. 16, 2014.

(51) Int. Cl.
| | |
|---|---|
| *B32B 27/38* | (2006.01) |
| *B32B 27/26* | (2006.01) |
| *B32B 27/18* | (2006.01) |
| *B32B 27/04* | (2006.01) |
| *C08J 5/24* | (2006.01) |
| *C08L 63/00* | (2006.01) |
| *C08G 59/38* | (2006.01) |
| *C08G 59/24* | (2006.01) |
| *C08G 59/50* | (2006.01) |
| *C08G 59/22* | (2006.01) |
| *C08G 59/32* | (2006.01) |

(52) U.S. Cl.
CPC ............ *C08L 63/00* (2013.01); *C08G 59/226* (2013.01); *C08G 59/24* (2013.01); *C08G 59/3227* (2013.01); *C08G 59/38* (2013.01); *C08G 59/50* (2013.01)

(58) Field of Classification Search
None
See application file for complete search history.

(56) References Cited

U.S. PATENT DOCUMENTS

2011/0184091 A1* 7/2011 Mizuki .............. C08G 59/4238
                                                          523/428

FOREIGN PATENT DOCUMENTS

| EP | 1162228 A1 | 12/2001 |
| EP | 2333010 A1 | 6/2011 |
| JP | 2011016985 A | 6/2010 |

OTHER PUBLICATIONS

Machine translation of JP 2011-016985 A (no date).*
International Search Report. PCT/US2015/065651, dated Apr. 4, 2016.

* cited by examiner

*Primary Examiner* — Michael J Feely
(74) *Attorney, Agent, or Firm* — Thi Dang

(57) ABSTRACT

A curable, epoxy-based resin composition that can be combined with reinforcement fibers and then cured to form a cured product that is excellent in toughness and exhibits high Open-Hole Tensile (OHT) strength. According to one embodiment, the resin composition contains a Bisphenol F difunctional epoxy, an anthracyl compound, a tri-functional epoxy, a thermoplastic polymer, and an amine-containing curing agent.

12 Claims, No Drawings

EPOXY-BASED RESIN COMPOSITION FOR COMPOSITE MATERIALS

This application claims the benefit of U.S. Provisional Patent Application No. 62/092,448, filed Dec. 16, 2014, the disclosure of which is incorporated by reference in its entirety.

BACKGROUND

Polymer matrix composite (PMC) materials are widely used in a number of applications. For example, such composite materials are being increasingly used in high-performance aerospace structures such as parts of airplanes and automobiles as high-strength, low weight materials to replace metals. PMC materials contain reinforcement fibers, such as carbon, glass and aramid fibers, embedded in a polymeric matrix material. The PMC materials exhibit good mechanical properties (e.g., strength, stiffness, toughness), as well as enable a wide processing temperature window and ease of manufacture, making them well suited for aerospace applications.

Methods for producing fiber-reinforced composite materials include a method of forming prepregs by impregnating sheet-like reinforcing fibers with an uncured matrix resin. This method is often called "prepregging" method. Multiple plies of the prepregs are laminated, consolidated and subsequently cured to form a composite part. Alternatively, composite parts may be formed using a resin transfer molding (RTM) method, which involves injecting a liquid resin into a preform of reinforcing fibers disposed in or on a mold and subsequently heating the resin-infused preform to cure the resin.

As the matrix resins used in PMC materials, thermosetting resins are mainly used because of their high solvent resistance and thermal resistance. Epoxy resins are often used because of the adhesiveness between the epoxy resins and the reinforcing fibers, and the mechanical properties such as strength and stiffness of the composite material obtained.

DETAILED DESCRIPTION

Prepreg properties and the quality of the resulting composite structures can be controlled to manipulate the quality and properties of the resulting composite structures made from the prepregs.

Different design considerations may be used in the fabrication of composite materials depending on the status of stress, the geometry and the boundary conditions that characterize the composite material considered. One such design consideration is notched properties. Notched properties are very important when the designed composite part contain holes for receiving fasteners. Notched properties measure the ability of a given composite material to carry load once a hole is drilled on the load bearing region of the composite material itself. One method for measuring such notched properties is the open-hole tension (OHT) strength test, for example, ASTM D5766, which is a well-established static method for determining the effect of a hole on the tensile strength of fiber-reinforced polymer composites.

Open hole tensile properties are predominately influenced by the strength of the carbon fiber with a minor influence coming from the cured resin matrix. This is inverse for open hole compression where the cured resin matrix is dominate. With a given fiber, the formulated resin matrix properties can be manipulated to increase the OHT or the OHC but very rarely can one of these properties be improved at without negativily affecting the other.

In many composite parts both OHT and OHC are important so a decrease in one property to achieve the other is undesirable. In the case where a composite part is being flexed one side will be under tension and the other under compression such as an airplane wing with upper and lower wing skins. Another example where increased tensile strength is important is in a composite storage tank where the inside is pressurized.

Disclosed herein is a curable, epoxy-based resin composition that can be combined with reinforcement fibers and then cured to form a cured product/structure that is excellent in toughness and exhibits high OHT, making it particularly suitable for aerospace applications. The incorporation of this composition in composite structures allows for an increase to the OHT properties without the negative effect on the OHC properties.

Epoxy-Based Resin Compositions

According to one embodiment of the present disclosure, the epoxy-based resin composition contains:
(A) an epoxy component that includes:
(i) a Bisphenol F difunctional epoxy represented by the following structure (I):

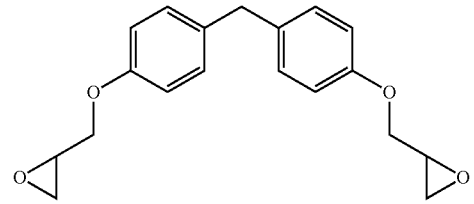 [SMILES: c1cc(OCC2CO2)ccc1Cc1ccc(OCC2CO2)cc1]

(ii) an anthracyl compound represented by the following structure (II):

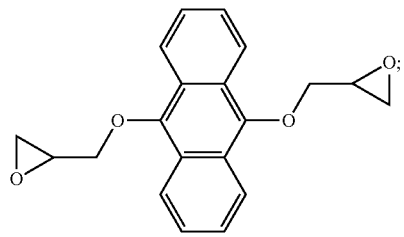 [SMILES: c1ccc2c(OCC3CO3)c3ccccc3c(OCC3CO3)c2c1]

and
(iii) a tri-functional epoxy;
(B) a thermoplastic polymer; and
(C) an amine-containing curing agent,
wherein, per 100 parts by weight of the epoxy component, the tri-functional epoxy is present in an amount of less than 30 parts, preferably 20-29 parts, and the difunctional epoxy is present in amount greater than that of the anthracyl compound. Preferably, the weight ratio of anthracyl compound to di-functional epoxy is 0.4 to 0.6.

The anthracyl compound is a unique monomer with two epoxide functional groups and is epoxy-like. It has been discovered that this anthracyl compound can modify the mechanical properties of the cured resin and the cured composite material formed therefrom under the right application and conditions. The unexpected finding is an increase in OHT at certain stoichiometry for components (A) to (C).

According to one embodiment, the epoxy component (A) contains, per 100 parts by weight of the epoxy component:
- 49-51 parts di-functional epoxy,
- 24-26 parts anthracyl compound, and
- 23-25 parts tri-functional epoxy resin.

The thermoplastic polymer (B) is present in an amount of 20 to 60 parts, more preferably 25 to 35 parts per 100 parts of the epoxy component, and in one embodiment, 30 parts per 100 parts of the epoxy component.

In a preferred embodiment, the amount of amine curing agent (D) in the composition is 70% to 90%, more preferably 75% to 80%, of the total epoxy equivalent weight. Or stated differently, the ratio of amine-containing curing agent to epoxy component is such that there is 0.7-0.9 mole, preferably 0.75-0.8 mole, of amine-hydrogen group for every mole of epoxide group [i.e. epoxy is combined with less than a stoichiometric amount of amine].

In most cases the amount of reactant epoxy groups are designed to cure with the same amount of amine reactant groups in a 1:1 ratio. This is to ensure the fastest reaction rates with maximum epoxy conversion. With the lower amount of amine hardener or lower stoichiometry, the excess epoxy will still be cured by homopolymerization (i.e., self-curing) at a slower rate. As a result, the epoxy resin composition of the present disclosure has been found to yield better OHT results under the lower amine/epoxy stoichiometric ratio as compared to a control with higher amine/epoxy stoichiometric ratio.

Suitable tri-functional epoxy resins (containing three epoxide groups) include:

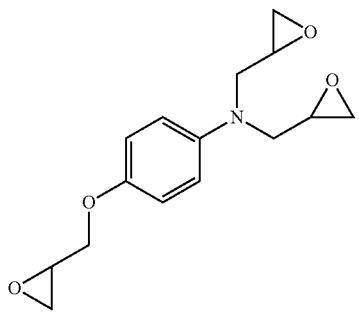 [SMILES: c1cc(N(CC2CO2)CC2CO2)ccc1OCC1CO1]

4-glycidyloxy-N,N-diglycidylaniline (commercially available as Araldite® MY0510 from Huntsman Advanced Materials);

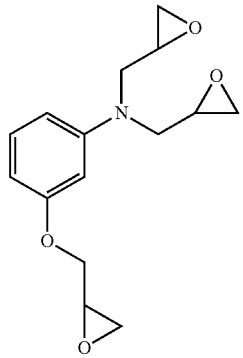 [SMILES: c1cc(OCC2CO2)cc(N(CC2CO2)CC2CO2)c1]

3-glycidyloxy-N,N-diglycidylaniline (commercially available as Araldite® MY0610 from Huntsman Advanced Materials).

The thermoplastic resin component is added to the epoxy-based resin composition to confer higher level of toughness such as Compression strength After Impact (CAI) and $G_{1c}$ fracture toughness. Fracture toughness may be quantified as strain energy release rate ($G_c$), which is the energy dissipated during fracture per unit of newly created fracture surface area. $G_c$ includes $G_{1c}$ (Mode 1—opening mode). The subscript "1c" denotes Mode I crack opening, which is formed under a normal tensile stress perpendicular to the crack.

Suitable thermoplastic polymer may be selected from: polyether sulphone (PES), polyetherether sulphone (PEES), PES-PEES copolymer with terminal amine groups, and combination thereof. In one embodiment, PES-PEES copolymer with terminal amine functional groups is used as the thermoplastic component. The manufacturing of this PES-PEES copolymer is disclosed in U.S. Pat. No. 6,437,080. The use of this PES-PEES copolymer has been found to impart improved viscosity to the resin composition, which enables better processing, manufacturing ability and prepreg handling.

Suitable amine curing agents (or curatives) include aromatic amines such as diaminodiphenyl sulfone, including 3,3'-diaminodiphenyl sulfone (3,3'-DDS) and 4,4'-diaminodiphenyl sulfone (4,4'-DDS); and fluorene amines such as 9,9-bis(3-chloro-4-aminophenyl)fluorine (CAF), and combinations thereof.

The resin compositions, as discussed herein, may further comprise additives, in minor amounts, to influence one or more of mechanical, rheological, electrical, optical, chemical, and/or thermal properties of the uncured or cured resin. Such additives may further comprise materials that chemically react with the epoxy resins, interact with the components therein, or are unreactive to the components. Examples of additives may include, but are not limited to, toughening particles (such as thermoplastic or elastomeric particles, core-shell rubber particles), flame retardants, ultraviolet (UV) stabilizers, antioxidants, colorants, and inorganic fillers (e.g., silica, alumina, calcium carbonate, talc, metallic particles) to enhance one or more of damage tolerance, toughness, wear resistance.

Composite Materials

The epoxy-based resin compositions described herein are suitable for fabricating composite materials, specifically, prepregs. Composite materials in this context refer to fiber-reinforced resin composites, which are composed of reinforcement fibers embedded in a matrix resin. The term "prepreg" as used herein refers to a layer of fibrous material that has been impregnated with a curable matrix resin. The fiber reinforcement material may be in the form of a woven or nonwoven fabric ply, or unidirectional tape. "Unidirectional tape" refers to a layer of reinforcement fibers, which are aligned in the same direction in a sheet-like configuration. The term "prepreg layup" as used herein refers to a plurality of prepreg plies that have been laid up in a stacking arrangement. As example, the number of prepreg plies may be 2-100 plies, or 10-50 plies.

A plurality of curable prepreg plies may be laid up in a stacking arrangement manually or by an automated process such as Automated Tape Laying (ATL). The prepreg plies within the layup may be positioned in a selected orientation with respect to one another. For example, prepreg layups may comprise prepreg plies having unidirectional fiber architectures, with the fibers oriented at a selected angle θ, e.g. 0°, 45°, or 90°, with respect to the largest dimension of the layup, such as the length. It should be further understood that, in certain embodiments, the prepregs may have any combination of fiber architectures, such as unidirectionally aligned fibers, multi-directional fibers, and woven fabrics.

Prepregs may be manufactured by infusing or impregnating continuous unidirectional fibers or woven fabric with the curable resin composition disclosed herein, creating a pliable and tacky sheet of material. This is often referred to as a prepregging process. The volume of fibers per square meter can also be specified according to requirements. Fiber areal weight (FAW) is measured in Grams per square meter (gsm). For some embodiments, the resin film applied on each face of the fabric may have a film weight of 10-200 gsm, and the fabric may have a fabric areal weight (FAW) of 100-600 gsm.

The term "impregnate" refers to the introduction of a curable matrix resin material to reinforcement fibers so as to partially or fully encapsulate the fibers with the resin. The matrix resin for making prepregs may take the form of resin films or liquids. Moreover, the matrix resin is in a curable/uncured state prior to bonding. Impregnation may be facilitated by the application heat and/or pressure.

As an example, the impregnating method may include:
(1) Continuously moving fibers through a (heated) bath of molten impregnating matrix resin composition to fully or substantially fully wet out the fibers; or
(2) Pressing top and bottom resin films against continuous, unidirectional fibers arranged in parallel or a fabric ply while applying heat at a temperature within the range of 80° C. to 300° C.

The reinforcement fibers in the composite substrates (e.g. prepregs) may take the form of chopped fibers, continuous fibers, filaments, tows, bundles, sheets, plies, and combinations thereof. Continuous fibers may further adopt any of unidirectional (aligned in one direction), multi-directional (aligned in different directions), non-woven, woven, knitted, stitched, wound, and braided configurations, as well as swirl mat, felt mat, and chopped mat structures. Woven fiber structures may comprise a plurality of woven tows, each tow composed of a plurality of filaments, e.g. thousands of filaments. In further embodiments, the tows may be held in position by cross-tow stitches, weft-insertion knitting stitches, or a small amount of resin binder, such as a thermoplastic resin.

The fiber materials include, but are not limited to, glass (including Electrical or E-glass), carbon, graphite, aramid, polyamide, high-modulus polyethylene (PE), polyester, poly-p-phenylene-benzoxazole (PBO), boron, quartz, basalt, ceramic, and combinations thereof.

For the fabrication of high-strength composite materials, such as those for aerospace and automative applications, it is preferred that the reinforcing fibers have a tensile strength of greater than 3500 MPa.

EXAMPLES

Example 1

Epoxy resin compositions were prepared according to the formulations shown in Table 1 below. Amounts for components A-E are in weight parts.

TABLE 1

| | Components | Control 1 | Control 2 | Comparison 3 | 4 |
|---|---|---|---|---|---|
| A | Bis-F di-functional epoxy (PY306[1]) | 11.49 | 37.13 | 8.36 | 26.33 |
| B | Anthracyl di-epoxy (YX8800[2]) | 0 | 0 | 14.4 | 13.21 |
| C | Tri-functional epoxy (MY510[3]) | 34.48 | 12.38 | 25.08 | 12.76 |
| D | PES-PEES copolymer | 30 | 30 | 30 | 30 |
| E | 4,4'-diamino diphenylsulphone (4,4'-DDS) | 24.03 | 20.5 | 22.16 | 17.7 |
| | Curative/Epoxy Stoichiometry % | 92.5 | 77.5 | 92.5 | 77.5 |
| | B/A Ratio | | | 1.67 | 0.5 |
| | OHTq-RT, MPa (ksi) | 539 MPa (78.1) | 543 MPa (78.7) | 575 MPa (83.4) | 617 MPa (89.4) |
| | OHCq-HW 180° F., MPa (ksi) | 286 MPa (41.5) | 262 MPa (38) | 288 MPa (41.8) | 276 MPa (40) |

[1]supplied by Huntsman Advanced Materials
[2]supplied by Mitsubishi Chemical Corporation
[3]supplied by Huntsman Advanced Materials Prepreg samples were prepared using the resin formulations of Table 1. The epoxy resins A, B, C were mixed and heated to approximately 150° F. Then the thermoplastic D was added, dispersed and dissolved by heating the mixture to 255° F. Once the thermoplastic was dissolved, the mixture was cooled to 165° F. The curative component D was then slurried into the mixture. The resin was frozen to minimize resin advancement. The film coating and prepreg processing was carried out using traditional hot melt processing equipment. For these experimental runs, a two-film process was used where a single resin formulation is film coated at 180° F. (82° C.) onto release paper and split into two equal length films. Wth the use of hot melt prepregging equipment, the resin films were applied to a unidirectional carbon fiber web on both the top and bottom simultaneously. The target FAW for the carbon fibers was 145 gsm and the target resin content was 33%. The hot-melt prepregging equipment included a moving sled with rollers that move back and forth over a 230° F. (130° C.) heated plate. This was followed by 3 subsequent nips to aid in consolidation of the resulting prepreg. Composite panels were made by laying up 24 prepreg plies according to orientation [+/90/−0]3S, to create a 14×14 inch panel that was cured under vacuum in an Autoclave for 3 hours at 350° F. (176.7° C.).

OHT test specimens were formed by cutting 12×1.5 inch specimens from the 14×14 inch cured panels. A 0.25 inch hole was drilled in the center of each test specimen. The specimens were loaded or clamped in tension and tested at the speed of 0.5 inches per minute at room temperature.

To obtain data for Open Hole Compression (OHCq-HW 180° F.), 12×1.5 inch test specimens of cured composite material were made as described above. A 0.25 inch hole was drilled in the center of each test specimen. Specimens were conditioned in a humidity chamber at 160° F. soak in water for 14 days. The specimens were then loaded and tested at the speed of 0.5 inches per minute at room temperature and at 180° F.

Formulation 4 resulted in the highest OHT strength as compared to Control formulations 1-3. The results for Control 3 and Formulations show that the presence of both components A and B produced higher OHT strength as compared to Control 1 and 2 which do not contain the anthracyl di-epoxy (component B). However, Control 3 had a high content of tri-functional epoxy (component C) and a high curative/epoxy stoichiometry, resulting in a lower OHT strength as compared to Formulation 4, which represents an improved and preferred composition.

Example 2

For comparison, prepreg samples were prepared by the same method discussed above in Example 1, using the resin formulations disclosed in Table 2. Amounts for components B-E are in weight parts.

TABLE 2

| | Components | | Comparison 5 | Comparison 6 | Comparison 7 |
|---|---|---|---|---|---|
| A | Bis-F di-functional epoxy | PY306 | 0 | 0 | 0 |
| B | Anthracyl di-epoxy | YX8800 | 30 | 17 | 16 |
| | Glycidy Anniline di-epoxy | GAN | 0 | 23 | 0 |
| C | Para-amino phenol tri-functional epoxy | MY510 | 30 | 17 | 75 |
| | | MY610[3] | 40 | 60 | 0 |
| | Tetra Glycidyl diamino diphenylmethane epoxy | MY721[4] | 0 | 0 | 9 |
| D | Polyethersulphone (PES) thermoplastic | 5003P[5] | 30 | 30 | 30 |
| E | 3,3'-diamino diphenylsulphone | | 29.5 | 29.8 | 26.8 |
| | Curative/Epoxy Stoichiometry % | | 99 | 99 | 80 |
| | OHTq-RT MPa (ksi) | | 578 MPa (83.75) | 573 MPa (83.1) | 432 MPa (62.6) |

[3,4]supplied by Huntsman Advanced Materials
[5]supplied by Sumika Excel

The resin formulations of Table 2 do not contain Bisphenol-F di-functional epoxy (Component A) as in the resin formulations of Table 1, and the curative/epoxy stoichiometry is high. Note that the OHT numbers for the resin formulations 5-7 are not as high as that obtained for the cured composite derived from Formula 4 of Table 1.

What is claimed is:
1. A curable epoxy-based resin composition comprising:
 (A) an epoxy component comprising:
  (i) a Bisphenol F difunctional epoxy represented by the following structure (I):

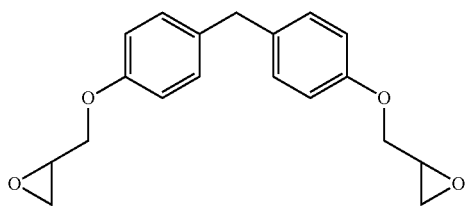 [SMILES: c1cc(OCC2CO2)ccc1Cc1ccc(OCC2CO2)cc1]

(ii) an anthracyl compound represented by the following structure (II):

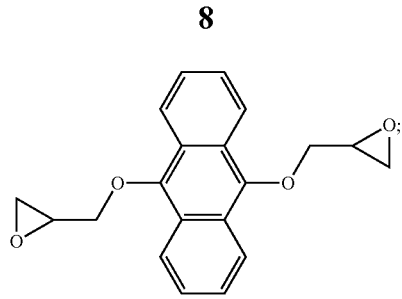

and
  (iii) a tri-functional epoxy;
 (B) a thermoplastic polymer selected from: polyether sulphone (PES), polyetherether sulphone (PEES), PES-PEES copolymer with terminal amine groups; and
 (C) an amine-containing curing agent;
 wherein, per 100 parts by weight of the epoxy component, the tri-functional epoxy is present in an amount of less than 30 parts, and the difunctional epoxy is present in amount greater than that of the anthracyl compound, and
 wherein, the ratio of epoxy component to amine-containing curing agent is such that there is 0.7-0.8 mole of amine-hydrogen group for every mole of epoxide group.

2. The curable epoxy-based resin composition of claim 1, wherein
 the tri-functional epoxy resin is represented by the following structure (III):

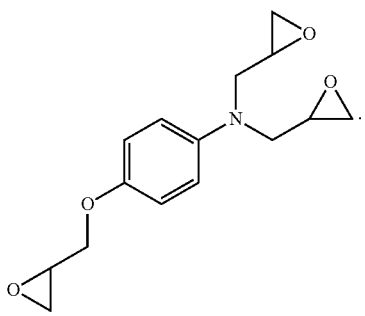 [SMILES: c1cc(N(CC2CO2)CC2CO2)ccc1OCC1CO1]

3. The curable epoxy-based resin composition of claim 1, wherein the amine-containing curing agent is diaminodiphenylsulfone (DDS) or fluorene amine.

4. The curable epoxy-based resin composition of claim 1, wherein the weight ratio of anthracyl compound to di-functional epoxy is 0.4 to 0.6.

5. The curable epoxy-based resin composition of claim 1, comprising, per 100 parts by weight of the epoxy component:
   49-51 parts di-functional epoxy,
   24-26 parts anthracyl compound, and
   23-25 parts tri-functional epoxy resin.

6. The curable epoxy-based resin composition of claim 1, wherein the thermoplastic polymer is a PES-PEES copolymer having terminal amine groups.

7. The curable epoxy-based resin composition of claim 1, wherein the tri-functional epoxy is present in an amount in the range of 20 to 29 parts.

8. A composite material comprising reinforcement fibers embedded in or infused with the curable epoxy-based resin composition of claim 1.

9. The composite material of claim 8, wherein the reinforcement fibers are selected from: carbon fibers, aramid fibers, and fiberglass fibers.

10. A prepreg comprising unidirectional fibers impregnated with the curable epoxy-based resin composition of claim 1.

11. The prepreg of claim 10, wherein the unidirectional fibers are selected from: carbon fibers, aramid fibers, and fiberglass fibers.

12. A composite laminate comprising a plurality of prepregs arranged in a stacking arrangement, each prepreg comprising unidirectional fibers impregnated with the curable epoxy-based resin composition of claim 1.

* * * * *